(No Model.)
T. MILTENBERGER.
REVOLVING HAY RAKE.
No. 365,014. Patented June 14, 1887.
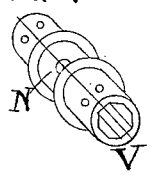
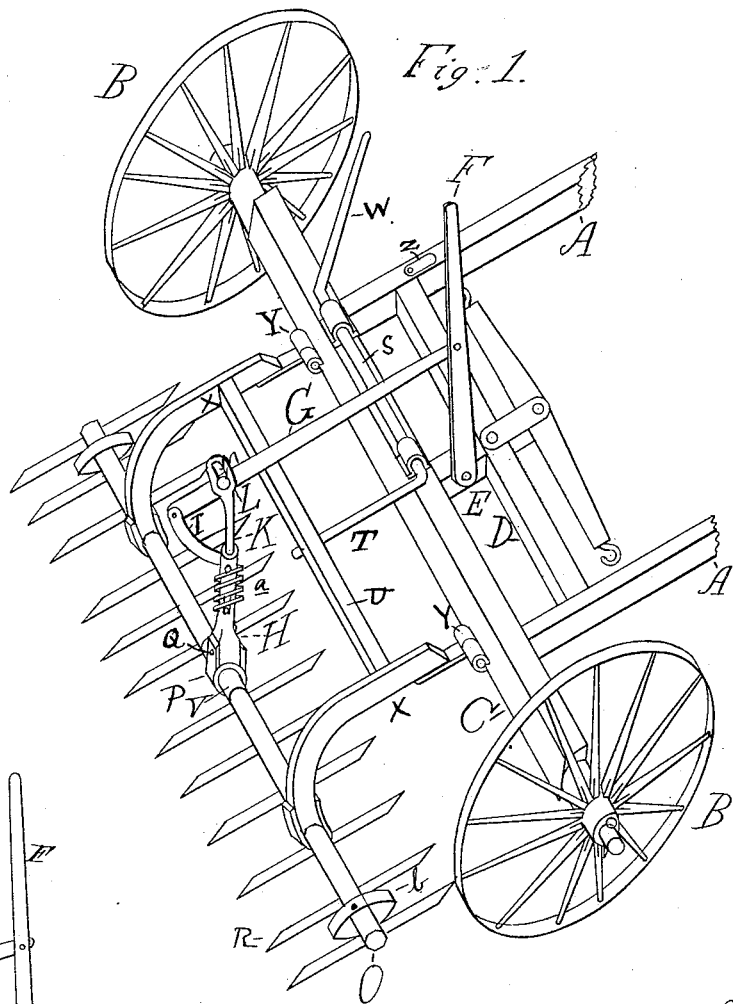
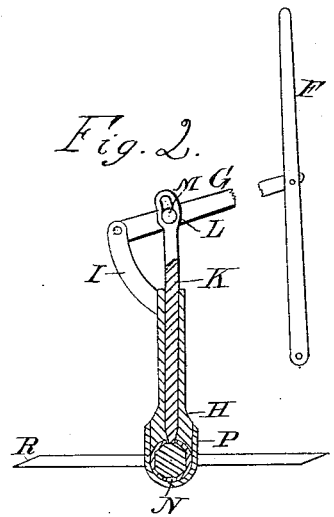
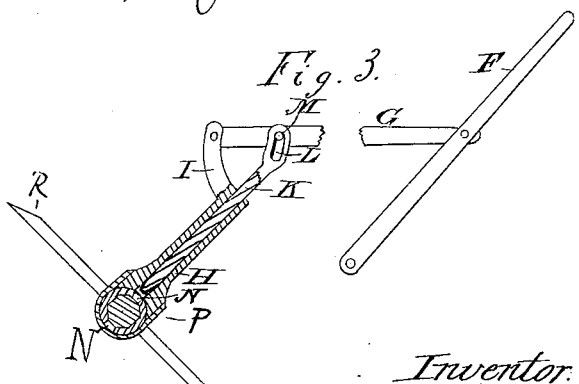
Witnesses:
W. U. Campbell
A. G. Stewart
Inventor:
Thomas Miltenberger
per C. D. Campbell, atty.

UNITED STATES PATENT OFFICE.

THOMAS MILTENBERGER, OF BELLEFONTAINE, OHIO.

REVOLVING HAY-RAKE.

SPECIFICATION forming part of Letters Patent No. 365,014, dated June 14, 1887.

Application filed July 12, 1886. Serial No. 211,006. (No model.)

*To all whom it may concern:*

Be it known that I, THOMAS MILTENBERGER, a citizen of the United States, and a resident of Bellefontaine, in the county of Logan and State of Ohio, have invented a new and useful Improvement in Revolving Hay-Rakes, of which the following is a specification.

My invention is an improvement in revolving sulky hay-rakes, and especially on my Patent No. 255,445, and relates to the connection between the rake-head and tilting or operating lever, and to the means of elevating the rake in traveling to and from the field.

Figure 1 is a rear perspective view; Fig. 2, a detached side view showing the rake-head in section in raking position. Fig. 3 is a side view with the rake in tilting position, the lever F being thrown forward. Fig. 4 is a perspective of the collar that surrounds the rake-head and is fastened to it, and in which standard H is mounted.

A A are the shafts; B B, the wheels; C, the axle; D, cross-piece connecting shafts; E, connecting-piece between cross-piece and axle; F, hand-lever pivoted to piece E; G, arm attached to lever F, and to arm I on standard H; H, standard mounted loosely on the rake-head; K, piston playing in standard H; L, slot in upper end of piston K; M, pin in arm G, playing in slot L; N, hole in collar V on each side of the rake-head, in which lower end of piston K fits; O, rake-head; P, U-shaped collar or strap which holds standard H on rake-head; Q, screws by which strap P is attached to the standard H; R, rake-teeth; S, a rod journaled on top of axle and bent at right angles at one end to form lever T, and at the other to form handle W; U, cross-piece connecting rake-supports X X; Y, hinged connection between supports X and axle C; V, collar surrounding rake-head and keeping standard H from sliding endwise thereon; Z, pivoted lug which turns around over lever W to hold the rake up when the lever is thrown forward; *a*, coil-spring that keeps piston K in hole N.

The object of my invention is to provide an attachment to the rake-head by which the action of the rake can be governed by the driver in his seat, and one in which the grass cannot catch and embarrass the connection between the rake-head and tilting device. The driver's seat is omitted from the drawings that the other parts may be more plainly shown.

The operation is as follows: The rake being in position, as shown in Fig. 1, and the driver being in his seat, the team is driven forward until the teeth have gathered full of hay, when the driver throws lever F forward into position shown in Fig. 3, throwing the standard H forward, as shown, and tilting the rake-head until the points of the teeth come in contact with the ground. The forward movement of the lever F and arm G opens these levers, as it were, on their pivotal point, enlarging the angle between them, and the arm G draws the piston K out of the standard H until the lower end is released from the hole N in the rake-head, allowing the rake to turn freely as the teeth come in contact with the ground.

The piston K has a slot, L, in its upper end that is made in an arc of a circle from pivotal point of arms I and G, so that when the driver, through lever F and arm G, rocks the rake-head to ride over small obstructions or inequalities of the ground, the pin M plays in the slot without withdrawing the piston from hole N in the rake-head.

The lower end of standard H is made concave to fit the collar around the rake-head, and is held in contact therewith by collar or strap P, surrounding the collar and secured to the standard by screws Q.

The standard H is prevented from sliding endwise on the rake by the collar being bolted to the rake-head, and having flanges on each side of standard H. These are screwed fast to the rake-head, and may be made in one piece or of two pieces united by a screw.

When the rake has been tilted and the teeth revolved, the lever F is brought back to the position shown in Fig. 1, and the piston K drops into the hole N on the other side of the rake-head, being forced down by the spiral spring *a*, concealed in the standard H.

When the rake is not in use and it is wished to transport it, or when in use and it is desired to raise the rake over a stump or other obstruction, the hand-lever W is thrown forward, raising the lever T, and with it the cross-piece U and rake. By turning the pivoted lug Z around over the arm W the rake is held in position off the ground.

The supports X X are hinged at their front ends to the axle and are curved downward at their rear ends, so as not to obstruct the gathering hay, and are attached to the rake-head by straps or collars which surround the head.

What I claim is—

1. The combination of the revolving rake-head and collar V, having holes N therein, with the standards H sleeved thereon, the piston K, the arm I, projecting from the standard, the link G, pivoted to the arm I and connected to the piston, and the lever F, as and for the purpose set forth.

2. In a revolving sulky hay-rake, the combination, with the lever F, pivoted link G, having the slot L therein, pin M, and piston K, of the rake-head having the collar V and standards H sleeved thereon, as and for the purpose set forth.

3. In a revolving sulky hay-rake, the combination, with the rake-head, operating-lever F, and the link G, attached to piston K, and pivoted to arm I, of the vertical standard H and piston K, by means of which the rake-teeth can be kept horizontal on the ground or tilted or dumped at will.

THOMAS MILTENBERGER.

Witnesses:
L. E. PETTIT,
JOHN SHURR.